United States Patent
Fuller et al.

(10) Patent No.: US 11,569,753 B1
(45) Date of Patent: Jan. 31, 2023

(54) APPARATUSES AND METHODS FOR AN ALTERNATING CURRENT TO DIRECT CURRENT CONVERTER

(71) Applicant: Honeywell Limited, Mississauga (CA)

(72) Inventors: Randy Fuller, Hillsburgh (CA); Louis Cheng, Richmond Hill (CA); Darning Ma, Mississauga (CA)

(73) Assignee: Honeywell Limited, Mississauga (CA)

( * ) Notice: Subject to any disclaimer, the term of this patent is extended or adjusted under 35 U.S.C. 154(b) by 0 days.

(21) Appl. No.: 17/506,338

(22) Filed: Oct. 20, 2021

(51) Int. Cl.
| | |
|---|---|
| *H02M 7/217* | (2006.01) |
| *H02M 7/08* | (2006.01) |
| *H02M 7/23* | (2006.01) |

(52) U.S. Cl.
CPC ........... *H02M 7/2173* (2013.01); *H02M 7/08* (2013.01); *H02M 7/23* (2013.01)

(58) Field of Classification Search
CPC .. H02M 1/0003; H02M 1/0032; H02M 1/081; H02M 1/042; H02M 7/04; H02M 7/23; H02M 7/08; H02M 7/155; H02M 7/1555; H02M 7/162; H02M 7/1623; H02M 7/217; H02M 7/2173; H02M 7/2176; H02M 7/219; H02M 7/2195; H02M 7/66; H02M 7/72; H02M 7/757; H02M 7/79; H02M 7/797; H02K 19/36; H02K 17/40; H02K 11/046; H02H 7/10
See application file for complete search history.

(56) References Cited

U.S. PATENT DOCUMENTS

| | | | |
|---|---|---|---|
| 5,309,078 A | * | 5/1994 | Cameron ................ H02P 27/08 318/811 |
| 5,512,811 A | | 4/1996 | Latos et al. |
| 5,552,640 A | | 9/1996 | Sutton et al. |
| 6,577,106 B2 | | 6/2003 | Lazarovich |
| 7,269,039 B2 | | 9/2007 | Cheng |
| 8,942,018 B2 | | 1/2015 | Ho et al. |
| 9,522,600 B2 | | 12/2016 | Namuduri et al. |
| 10,256,742 B2 | | 4/2019 | Hui et al. |
| 10,491,145 B2 | | 11/2019 | Noderer |
| 2002/0158600 A1 | * | 10/2002 | Seima ..................... H02P 6/085 318/727 |
| 2007/0244683 A1 | | 10/2007 | Cheng et al. |
| 2012/0126758 A1 | * | 5/2012 | Fang ....................... H02P 25/22 322/29 |
| 2016/0099658 A1 | * | 4/2016 | Ishimaru ................ H02M 7/219 310/68 D |
| 2018/0123474 A1 | * | 5/2018 | Tremblay ............. H03K 17/687 |
| 2019/0031041 A1 | * | 1/2019 | Rozman .................. B60L 50/12 |
| 2019/0241264 A1 | | 8/2019 | Phan et al. |
| 2019/0372477 A1 | * | 12/2019 | Pidutti .................... H02M 1/08 |
| 2020/0228027 A1 | * | 7/2020 | Ayana ................... H02M 7/219 |

FOREIGN PATENT DOCUMENTS

WO    2018097820 A1    5/2018

* cited by examiner

*Primary Examiner* — Thienvu V Tran
*Assistant Examiner* — Shahzeb K Ahmad
(74) *Attorney, Agent, or Firm* — Fogg & Powers LLC (57) ABSTRACT

A mode of a rectifier may be changed between at least fully passive and fully synchronous based upon direct current (DC) output by the rectifier and/or direct current voltage output by the rectifier. This extends the range of direct current output by the rectifier for a given range of DC voltage output by the rectifier.

20 Claims, 4 Drawing Sheets

APPARATUSES AND METHODS FOR AN ALTERNATING CURRENT TO DIRECT CURRENT CONVERTER

BACKGROUND

A generator on aircraft is used to convert mechanical energy from an engine or a ram air turbine into alternating current (AC) electrical power, or to convert received AC electrical power into mechanical energy used to start the engine or the ram air turbine. Typically, a wound field generator or a brush generator is used. However, wound field generators typically are larger and heavier than other types of generators, and brush generators undesirably must periodically have their brushes replaced.

SUMMARY

An apparatus for providing electrical rectification, comprising: at least two sets, wherein each set comprises a first transistor diode pair serially electrically coupled to a second transistor diode pair, wherein each transistor diode pair comprises a transistor and a diode, wherein an anode of the diode is electrically coupled to a first non-control node of the transistor, a cathode of the diode is electrically coupled to a second non-control node of the transistor, wherein, for each set, a cathode of a diode of the first transistor diode pair is electrically coupled to an anode of a diode of the second transistor diode pair, and wherein each set is configured to receive an unique alternating current (AC) electrical phase, of an AC electrical power; at least two groups, wherein each group comprises a first driver circuit and a second driver circuit, wherein each first driver circuit of a group is electrically coupled to a control terminal of a transistor of the first transistor diode pair of an unique set, and to an anode and to a cathode of a diode of the first transistor diode pair of the unique set, and wherein each second driver circuit of a group is electrically coupled to a control terminal of a transistor of the second transistor diode pair of the unique set, and to an anode and to a cathode of a diode of the second transistor diode pair of the unique set; wherein the cathode, of the diode of the second transistor diode pair of each set are electrically coupled, wherein the anode, of the diode of the first transistor diode pair of each set are electrically coupled, and wherein each set is configured to generate a direct current (DC) electrical power across the electrically coupled cathodes of diodes of second transistor diode pairs and the electrically coupled anodes of diodes of first transistor diode pairs; and a control circuit, wherein the control circuit is configured to: select an initial mode of rectification, wherein modes of rectification comprise fully passive rectification and fully synchronous rectification; receive or measure at least one of: (a) a level of a direct current generated by the at least two sets and (b) a level of a DC voltage generated by the at least two sets; determine whether a previously selected mode of rectification should be changed to another mode of rectification based upon at least one of: (x) whether the level of direct current is within a range of direct current levels corresponding to the other mode of rectification and (y) whether the level of the DC voltage is greater than a highest voltage threshold level of the previously selected mode of rectification, or lower than a lowest voltage threshold level of the previously selected mode of rectification; determining that the previously selected mode of rectification should be changed, then causing the previously selected mode of rectification to be changed to the other mode of rectification; upon initially selecting the initial mode of rectification that is the fully passive rectification or changing the previously selected mode of rectification to the fully passive rectification, send a first signal to each driver circuit to cause to turn off a transistor of each first transistor diode pair and a transistor of each second transistor diode pair so that the diode, and not the transistor, of each first transistor diode pair and the diode, and not the transistor, of each second transistor diode pair are commutated at a frequency of a corresponding AC electrical phase; and upon initially selecting the initial mode of rectification that is the fully synchronous rectification or changing the previously selected mode of rectification to the fully passive rectification, send a second signal to each driver circuit to cause to turn on the transistor of each first transistor diode pair and the transistor of each second transistor diode pair so that the diode and the transistor of each first transistor diode pair and of each second transistor diode pair are commutated at the frequency of the corresponding AC electrical phase.

A method for operating a rectifier comprising at least two sets, the method comprising: receiving an AC electrical power, comprising at least two AC electrical phases, from a permanent magnet generator (PMG), wherein each set comprises a first transistor diode pair serially electrically coupled to a second transistor diode pair, wherein each set is configured to receive an unique alternating current (AC) electrical phase of the AC electrical power; selecting an initial mode of rectification, wherein modes of rectification comprise fully passive rectification and fully synchronous rectification; receiving or measuring at least one of: (a) a level of a direct current generated by the at least two sets and (b) a level of a DC voltage generated by the at least two sets, wherein each set is configured to receive an unique alternating current (AC) electrical phase of the AC electrical power; determining whether a previously selected mode of rectification should be changed to another mode of rectification based upon at least one of: (x) whether the level of direct current is within a range of direct current levels corresponding to the other mode of rectification and (y) whether the level of the DC voltage is greater than a highest voltage threshold level of the previously selected mode of rectification, or lower than a lowest voltage threshold level of the previously selected mode of rectification; determining that the previously selected mode of rectification should be changed to the other mode of rectification, then causing the previously selected mode of rectification to be changed to the other mode of rectification; upon initially selecting the initial mode of rectification that is the fully passive rectification or changing the previously selected mode of rectification to the fully passive rectification, sending a first signal to each driver circuit to cause to turn off a transistor of each first transistor diode pair and a transistor of each second transistor diode pair so that a diode, and not a transistor, of each first transistor diode pair and a diode, and not a transistor, of each second transistor diode pair are commutated at a frequency of a corresponding AC electrical phase; upon initially selecting the initial mode of rectification that is the fully synchronous rectification or changing the previously selected mode of rectification to the fully passive rectification, sending a second signal to each driver circuit to cause to turn on the transistor of each first transistor diode pair and the transistor of each second transistor diode pair so that the diode and the transistor of each first transistor diode pair and of each second transistor diode pair are commutated at the frequency of the corresponding AC electrical phase; and generating DC electrical power from the at least two sets.

A program product comprising a non-transitory processor readable medium on which program instructions are embodied, wherein the program instructions are configured, when executed by at least one programmable processor, to cause the at least one programmable processor to: select an initial mode of rectification, wherein modes of rectification comprise fully passive rectification and fully synchronous rectification; receive at least one of: (a) a level of a direct current generated by at least two sets and (b) a level of a DC voltage generated by at least two sets, wherein each set comprises a first transistor diode pair serially electrically coupled with a second transistor diode pair, and wherein each set is configured to receive an unique alternating current (AC) electrical phase of AC electrical power; determine whether a previously selected mode of rectification should be changed to another mode of rectification based upon at least one of: (x) whether the level of direct current is within a range of direct current levels corresponding to the other mode of rectification and (y) whether the level of the DC voltage is greater than a highest voltage threshold level of the previously selected mode of rectification, or lower than a lowest voltage threshold level of the previously selected mode of rectification; determine that the previously selected mode of rectification should be changed to the other mode of rectification, then causing the previously selected mode of rectification to be changed to the other mode of rectification; upon initially selecting the initial mode of rectification that is the fully passive rectification or changing the previously selected mode of rectification to the fully passive rectification, send a first signal to cause to turn off a transistor of each first transistor diode pair and a transistor of each second transistor diode pair so that a diode, and not a transistor, of each first transistor diode pair and a diode, and not a transistor, of each second transistor diode pair are commutated at a frequency of a corresponding AC electrical phase; and upon initially selecting the initial mode of rectification that is the fully synchronous rectification or changing the previously selected mode of rectification to the fully passive rectification, send a second signal to cause to turn on the transistor of each first transistor diode pair and the transistor of each second transistor diode pair so that the diode and the transistor of each first transistor diode pair and of each second transistor diode pair are commutated at the frequency of the corresponding AC electrical phase.

DRAWINGS

Embodiments of the present invention can be more easily understood and further advantages and uses thereof more readily apparent when considered in view of the description of the preferred embodiments and the following figures in which.

In accordance with common practice, the various described features are not drawn to scale but are drawn to emphasize specific features relevant to the exemplary embodiments. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present invention. The following detailed description is, therefore, not to be taken in a limiting sense. Further, although aircraft are exemplified herein for pedagogical purposes, embodiments of the invention are more generally applicable to vehicles other than aircraft (including trains, ships, other aerial vehicles, and any other type of vehicle) or even systems that are not vehicles.

A permanent magnet generator may be used in lieu of alternative electrical generators. A PMG is lighter, smaller, and more reliable than other types of generators. Output DC voltage of a PMG increases or decreases as PMG rotation rate respectively increases or decreases.

The AC electrical power is provided by or to the PMG by an AC/DC electrical power converter. The AC/DC electrical power converter converts AC electrical power to DC electrical power, and vice versa. When converting AC electrical power to DC electrical power, output DC voltage of a conventional AC/DC converter undesirably diminishes, based upon PMG internal impedance, as direct current drawn by an electrical load, e.g., the engine or the ram air jet, increases. Thus, for a desired range of direct current output by the AC/DC power converter (operating as a rectifier), a range of DC voltage output by the AC/DC power converter (operating as a rectifier) may be too large; the range of DC voltage include higher DC voltages that can damage component(s) powered by the DC voltage or lower DC voltage that are insufficient to operate the components. The voltage drop may be compensated by increasing PMG components', and thus PMG's, size and weight to reduce PMG internal impedance, or increasing PMG rotation rate. Increasing PMG, and thus aircraft, size and weight undesirably diminishes aircraft fuel efficiency and increases carbon dioxide emissions which aggravates global climate change. Modifying PMG rotation rate is also undesirable because it can result in an undesirable transient voltage and an excessively high voltage being applied to the electrical load. For pedagogical purposes, the electrical load may be referred to herein as an engine or a ram air turbine. The voltage drop may be overcome by modifying the AC/DC electrical power converter to improve converter efficiency. Therefore, apparatus and methods for improving efficiency of an AC/DC electrical power converter are provided, e.g., when a permanent magnet generator is used; however, embodiments of the invention may not be limited to PMG applications.

Figure 1:
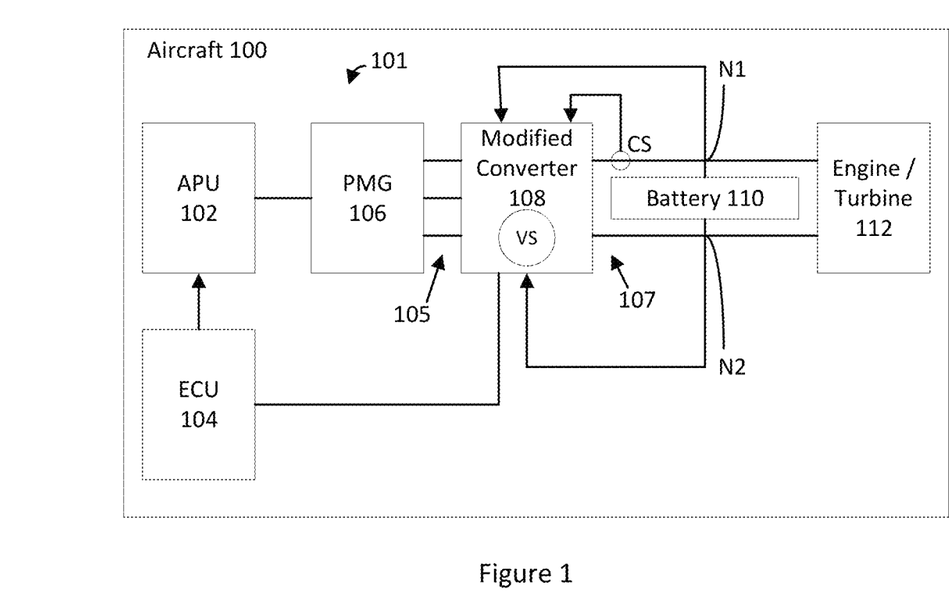
FIG. 1 illustrates a block diagram of one embodiment of a power generation system of an aircraft.

FIG. 1 illustrates a block diagram of one embodiment of a power generation system 101 of an aircraft 100. The power generation system 101 includes an auxiliary power unit (APU) 102, an engine control unit (engine control circuit or ECU) 104, a permanent magnet generator (PMG) 106, a current sensor CS, and a modified AC/DC electrical power converter (modified converter) 108. Optionally, the power generation system 101 comprises a rechargeable battery (battery) 110. The power generation system 101 is configured to be electrically coupled to an engine or a ram air turbine (engine/turbine) 112. The engine or ram air turbine 112 may hereafter be referred to as an engine (although it may alternatively be implemented as a ram air turbine). The modified converter 108 is electrically coupled to the engine 112 and to the PMG 106. The modified converter 108 provides and/or receives DC electrical power to the engine 112. The modified converter 108 receives and/or provides AC electrical power to the PMG 106. The APU 102 is mechanically coupled to the PMG 106, and is configured to cause the PMG 106 to mechanically rotate or to be mechanically rotated by the PMG 106. The APU 102 is implemented with an engine or a ram air turbine. The modified converter 108 may also be referred herein as a modified converter circuit.

Operation, e.g., rotation rate, of the APU 102 is controlled by an electronic control unit (ECU) 104. The ECU 104 is electrically coupled to the APU 102. Optionally, the modified converter 108 is electrically coupled to the ECU 104. Electrical conductors may be used to facilitate electrically coupling or connecting components described herein.

The current sensor CS is electrically or magnetically coupled to a DC input/output 107 of the modified converter 108. The current sensor CS is configured to measure current flowing into or out of the DC input/output 107 of the modified converter 108. The current sensor CS may be a Hall effect sensor, a resistor across which a voltage drop corresponds to current flow through the resistor, or any other type of current sensor. The current level measured by the current sensor CS is received by the modified converter 108 and may be used by the modified converter 108 to select a mode of rectification of the modified converter 108 (as is described elsewhere herein).

The DC input/output 107 of the modified converter 108 are terminals of the modified converter 108 configured to be electrically coupled to the engine 112, and (if used) the optional battery 110. An AC input/output 105 of the modified converter 108 are terminals of the modified converter 108 configured to be electrically coupled to the PMG 106.

If used, the optional battery 110 is electrically coupled between the modified converter 108 and the engine 112. The battery 110 may be implemented with nickel cadmium, lead acid, or other rechargeable battery chemistries. DC electrical power generated by the modified converter 108 may be used to charge the battery 110. The battery 110 may be used to provide DC electrical power to the modified converter which generates AC electrical energy to mechanically rotate the PMG to start the APU 102.

Optionally, the modified converter 108 is configured to measure a DC voltage, e.g., across a first electrical node N1 and a second electrical node N2 at the DC input/output 105 of the modified converter 108, across conductors coupling the modified converter 108 to the engine 112, and/or across terminals of the battery 110. Thus, optionally, the modified converter 108 comprises a voltage measurement circuit (or a voltage sensor) V. Alternatively, the modified converter 108 is configured to receive a measured DC voltage measurement from a voltage measurement circuit (or voltage sensor) (external to the modified converter 108) electrically coupled across the first electrical node N1 and the second electrical node N2. The DC voltage measured across the first electrical node N1 and the second electrical node N2 may be used by the modified converter 108 to select a mode of rectification of the modified converter 108 (as is described elsewhere herein). Alternatively or additionally, the DC voltage measured across the first electrical node N1 and the second electrical node N2 may be used to ascertain a voltage of the battery 110, and thus a level of charge of the battery.

Figure 2:
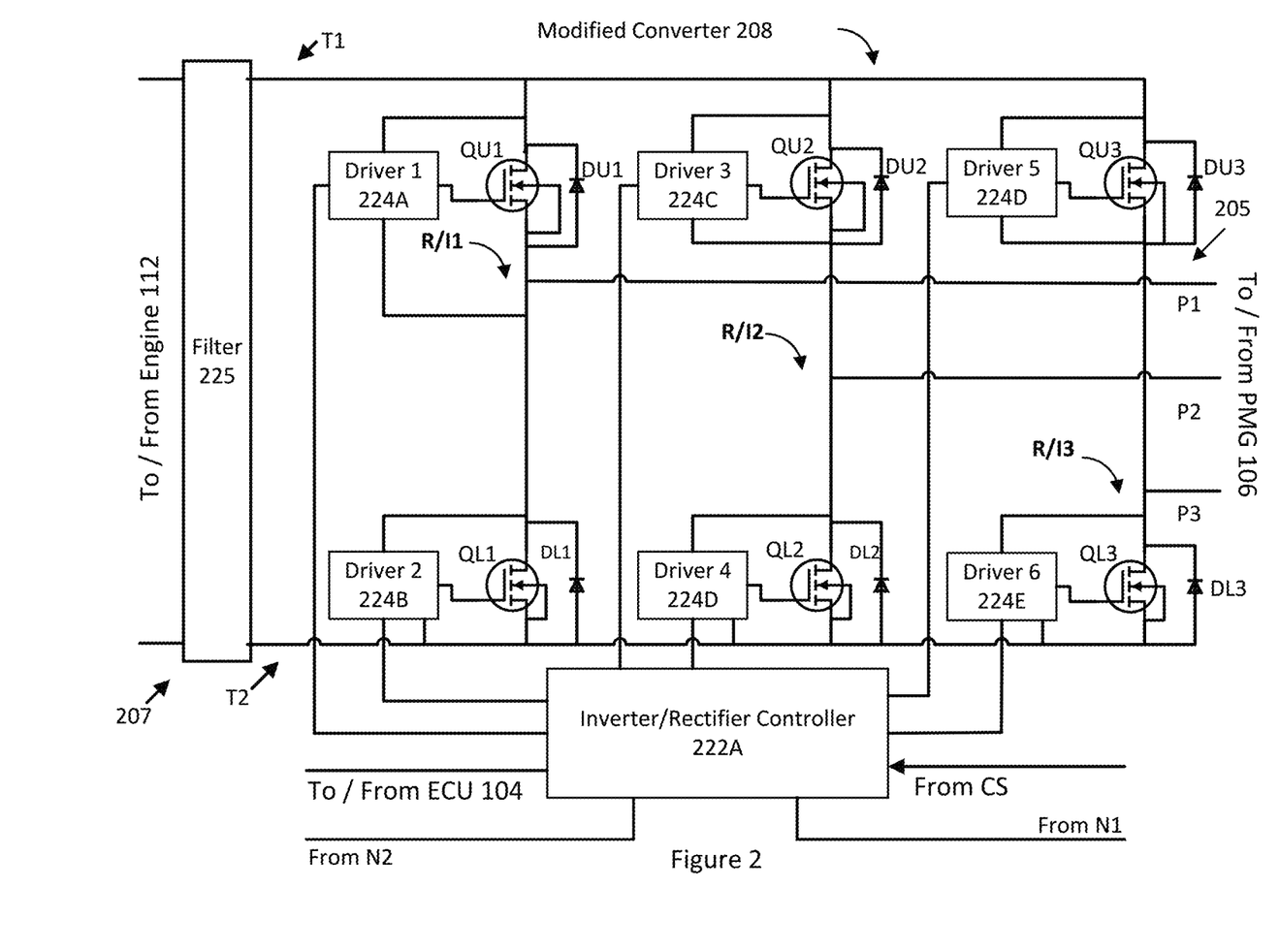
FIG. 2 illustrates a block diagram of one embodiment of a modified converter.

FIG. 2 illustrates a block diagram of one embodiment of the modified converter 208. The modified converter 208 is configured to operate as a rectifier when converting AC electrical power to DC electrical power. The modified converter 208 is configured to operate as an inverter when converting DC electrical power (e.g., provided by the optional battery 110) to AC electrical power.

The modified converter 208 comprises an inverter/rectifier controller (or inverter/rectifier control circuitry) 222A which is configured to receive data (from sensor(s), e.g., the current sensor CS and/or a voltage sensor VS (within or external to the inverter/rectifier controller 222A) configured to measure a DC voltage at a DC input/output 207 of the modified converter 208). The data indicates a DC current level flowing out of the DC input/output 207 of the modified converter 208, e.g., to the engine 112, and/or the DC voltage level at the DC input/output 207. Depending upon the current level drawn from the DC input/output 207 of the modified converter 208 and/or the DC voltage at the DC input/output 207, the inverter/rectifier controller 222A causes the modified converter 208 to operate in (or change between) one of at least two modes: fully passive rectification and fully synchronous rectification. Optionally, based upon the current level drawn from the DC input/output 207 of the modified converter 208 and/or the DC voltage at the DC input/output 207, the inverter/rectifier controller 222A controls the modified converter 208 to operate in (or change between) one of three modes: fully passive rectification, partially passive and partially synchronous rectification, and fully synchronous rectification. The inverter/rectifier controller 222A may also be referred to herein as an inverter/rectifier control circuit or a control circuit.

Figure 3:
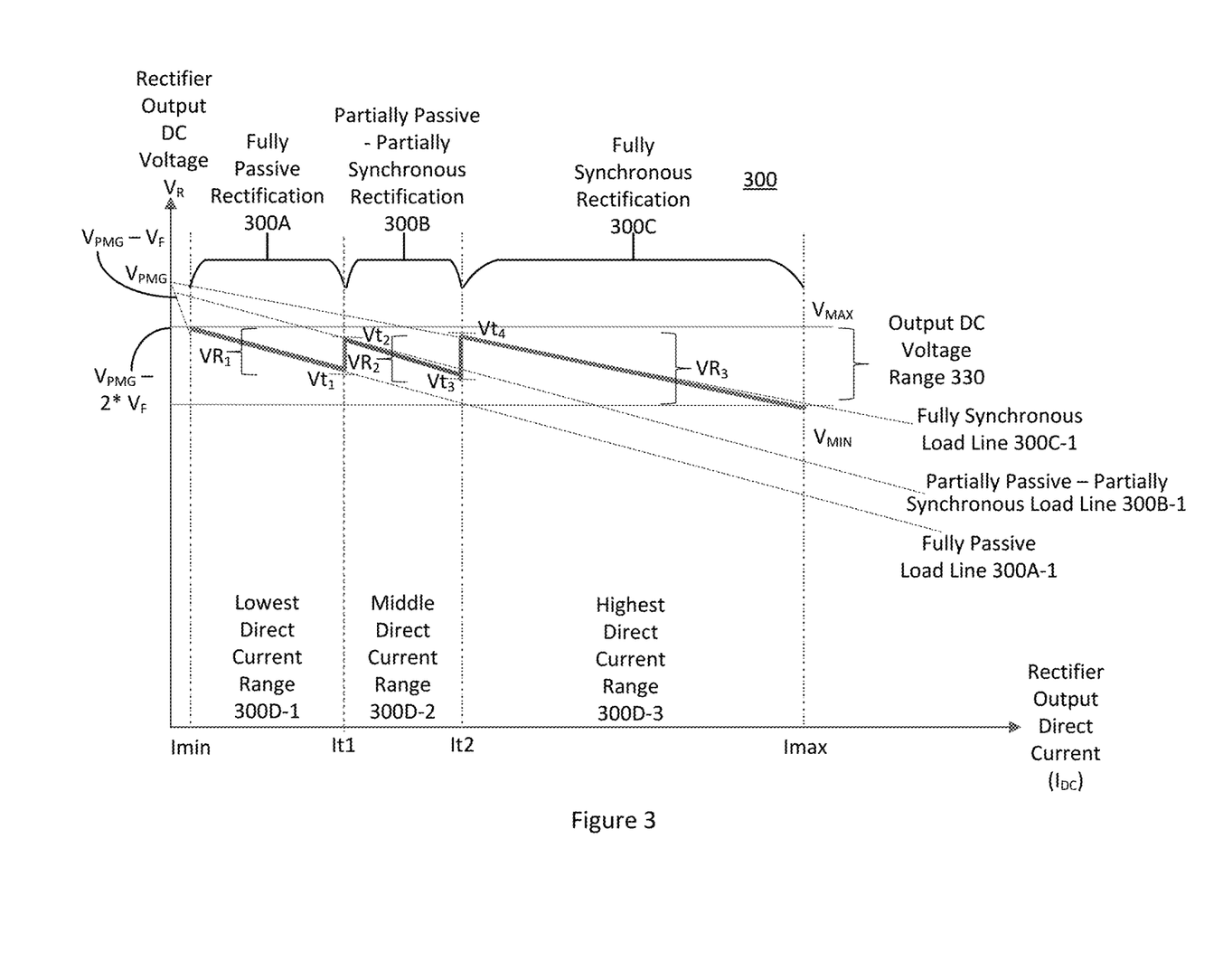
FIG. 3 illustrates a diagram of one embodiment of the three modes of the modified converter.

FIG. 3 illustrates a diagram of one embodiment of three modes 300 of the modified converter. The three modes are fully passive rectification 300A, fully synchronous rectification 300C, and an optional mode: partially passive-partially synchronous rectification 300B.

An optional output DC voltage range 330, from the DC input/output 207 of the modified converter 208 (when operating as a rectifier), is illustrated. The output DC voltage range 330 is bounded by a maximum DC voltage level $V_{MAX}$, e.g., 28V, and a minimum DC voltage level $V_{MIN}$, e.g., 25V. The maximum DC voltage level $V_{MAX}$ may be defined by the maximum DC voltage that the engine 112 and/or the battery 110 can tolerate prior to being damaged and/or failing to operate, e.g., start or charge. The minimum DC voltage level $V_{MIN}$ may be defined by the minimum DC voltage necessary to start the engine 112 and/or to charge the battery 110.

To ensure that the DC voltage output from the DC input/output 207 of the modified converter 208 (when operating as a rectifier) remains within the output DC voltage range 330, the modified converter 208 is configured to switch between fully passive rectification 300A and fully synchronous rectification 300C, or optionally between fully passive rectification 300A, partially passive-partially synchronous rectification 300B, and fully synchronous rectification 300C. The fully passive rectification occurs in a lowest direct current range 300D-1 (from a minimum current threshold level Imin to a first current threshold level It1) drawn from the DC input/output 207 of the modified converter 208 (operating as a rectifier) and in a first DC voltage range $VR_1$, e.g., from the maximum DC voltage level $V_{MAX}$ to a first voltage threshold level $Vt_1$. Passive rectification is performed by diodes alone of the rectifiers/inverters. Passive rectification is performed (a) for a portion of a first one hundred and eighty degrees of phase of an AC electrical phase when the AC electrical phase forward biases a first diode, e.g., the upper or lower diode, of a rectifier of the AC electrical phase, and (b) for a portion of a second one hundred and eighty degrees of the phase of the AC electrical phase when the AC electrical phase forward biases a second diode, e.g., respectively the lower or the upper diode, of the rectifier of the AC electrical phase. When one of the diodes of a rectifier inverter is forward biased (turned on), the other diode of the rectifier inverter is not forward biased (turned off).

When operating as a rectifier and providing direct current with in the lowest direct current range 300D-1 and the first DC voltage range $VR_1$, the modified converter 208 employs fully passive rectification 300A. The PMG DC voltage output $V_{PMG}$, e.g., 30V, is reduced by a diode forward voltage drop $V_F$ of each diode of each rectifier inverter. For a silicon diode comprising p-type silicon and n-type silicon, the diode forward voltage drop $V_F$ is 0.7V. Thus, in the fully passive rectification mode and at direct current levels when diodes of each inverter rectifier of the modified converter 208 are forward biased, the rectifier DC output voltage $V_R$, at the DC input/output 207, of the modified converter (when operating as a rectifier) is the PMG DC voltage output $V_{PMG}$ diminished by twice a diode forward voltage drop $V_F$ (or $V_{PMG}-2*V_F$), e.g., $28.6V_{DC}$. In fully passive rectification 300A and direct current levels when both diodes of each rectifier inverter of the modified converter are forward biased, a fully passive load line 300A-1 at the DC input/output 207 of the modified converter 208 (when operating as a rectifier) is about an internal impedance of the PMG 106 plus the impedances of both diodes of each rectifier inverter. A load line means a function relating rectifier output DC voltage $V_R$ (at the DC input/output 207 of the modified converter 208) to rectifier output direct current $I_{DC}$ (flowing from the DC input/output 207 of the modified converter 208).

Optionally, to obtain a desired maximum DC voltage level $V_{MAX}$ (at a minimum current threshold level Imin), the modified converter 208, e.g., the inverter/rectifier controller 222A, causes the PMG 106 to generate an AC voltage level which compensates for the diode forward voltage drops across the two diodes of each rectifier inverter of the modified converter 208. Thus, optionally, the modified converter 208, e.g., the inverter/rectifier controller 222A, may be configured to communicate a control signal to the ECU 104 to have the APU 102 rotates a higher rotation rate causing the PMG 106 to rotate at a higher rotation rate to generate a higher AC voltage level which when rectified in the fully passive rectification mode results in a maximum rectifier DC output voltage above or at a desired threshold level.

The optional partially passive and partially synchronous rectification occurs in a middle direct current range 300D-2 (from the first current threshold level It1 to a second current threshold level It2) drawn from the DC input/output 207 of the modified converter 208, and in a second DC voltage range $VR_2$, e.g., from a second voltage threshold level $Vt_2$ to a third voltage threshold level $Vt_3$. Partially passive and partially synchronous rectification is performed by having either all upper rectifiers/inverters or all lower rectifier inverters operated as synchronous rectifiers (utilizing transistors for rectification), and respectively all lower rectifiers inverters or all upper rectifier/inverters operated as passive rectifiers (not using transistors for rectification). Thus, only the upper or lower rectifier inverters (operated synchronously) will operate in a manner similar to what is described for full synchronous rectification; only respectively the lower or upper rectifier inverters (operated passively) will operate in a manner similar to what is described for full passive rectification. As further illustrated elsewhere herein, synchronous rectification occurs when a transistor (whose non-control terminals are electrically coupled in parallel with the anode and cathode of a diode) is turned on (and thus has a low impedance) when the diode is forward biased (or turned on) so that the voltage drop across the diode is reduced substantially, e.g., to equal a voltage drop across non-control terminals of the transistor. All lower rectifiers/inverters or all upper rectifier/inverters (which are not operated as synchronous rectifiers) perform passive rectification. A diode is deemed turned on when the diode is forward biased. A diode is deemed turned off when the diode is not forward biased.

All or part of the lowest direct current range 300D-1 may be lower than the highest and/or middle direct current ranges. All or part of the middle direct current range 300D-2 may be lower than the highest direct current range 300D-3. Optionally, one range may overlap another range, and hysteresis may be employed by the modified converter 208, e.g., the inverter/rectifier controller 222A, to avoid a ping ponging effect. Optionally, no hysteresis is employed by the modified converter 208, e.g., the inverter/rectifier controller 222A, for the DC voltage ranges described herein; however, alternatively, hysteresis may be used for such DC voltage ranges.

When operating as a rectifier and providing direct current with in a middle direct current range 300D-2, the modified converter 208 employs partially passive-partially synchronous rectification 300B. The PMG DC voltage output $V_{PMG}$, e.g., 30V, is reduced by a diode forward voltage drop $V_F$ of one diode (used to provide passive rectification) of each rectifier inverter. Thus, in the partially passive-partially synchronous rectification mode and at a direct current level when the diode (used to provide passive rectification) of each inverter rectifier of the modified converter 208 is forward biased, the rectifier DC output voltage $V_R$, at the DC input/output 207, of the modified converter (when operating as a rectifier) is the PMG DC voltage output $V_{PMG}$ diminished by a diode forward voltage drop $V_F$ (or $V_{PMG}-V_F$), e.g., $29.3V_{DC}$. In partially passive-partially synchronous rectification 300B, a load line at the DC input/output 207 of the modified converter 208 (when operating as a rectifier) is an internal impedance of the PMG 106 plus the impedances of one diode of each rectifier inverter. Because the middle direct current range commences at a direct current level higher than the direct current level corresponding to the onset of a diode being forward biased, the highest DC voltage of the middle direct current range 300D-2 is less than $V_{PMG}-V_F$ due to a partially passive-partially synchronous load line 300B-1. In partially passive-partially synchronous rectification 300B and direct current levels when one diode of each rectifier inverter of the modified converter is forward biased, a partially passive-partially synchronous load line 300B-1 at the DC input/output 207 of the modified converter 208 (when operating as a rectifier) is about an internal impedance of the PMG 106 plus the impedances of both diodes of each rectifier inverter.

Fully synchronous rectification 300C occurs in the highest direct current range 300D-3 (from the second current threshold level It2 to a maximum current threshold level Imax) drawn from the DC input/output 207 of the modified converter 208, and in a third DC voltage range $VR_3$, e.g., from a fourth voltage threshold level $Vt_4$ to the minimum DC voltage level $V_{MIN}$. Fully synchronous rectification is performed by having all upper and lower rectifiers/inverters operated as synchronous rectifiers.

Fully synchronous rectification is performed (a) for a portion of a first one hundred and eighty degrees of phase of an AC electrical phase when the AC electrical phase forward biases a first diode, e.g., the upper or lower diode,[1] of a rectifier inverter of the AC electrical phase, and (b) for a portion of a second one hundred and eighty degrees of the phase of the

[1] Turning on a first transistor diode pair of which the first diode is part and which is part of the rectifier inverter.

AC electrical phase when the AC electrical phase forward biases a second diode, e.g., respectively the lower or the upper diode,[2] of the rectifier of the AC electrical phase. Thus, when a diode is forward biased (turned on), a corresponding transistor (whose non-control terminals are electrically coupled in parallel to the anode and the cathode of the diode) is also turned on. When one of transistor diode pair of a rectifier inverter is turned on, the other transistor diode pair of the rectifier inverter is turned off. Note, a diode is forward biased only when a voltage across the anode and the cathode exceeds the forward bias voltage drop of the diode, where the voltage on the anode is positive with respect to the voltage on the cathode; because of the forward bias voltage drop, rectification only occurs during a portion of each one hundred and eighty degrees of a phase.

In the fully synchronous mode, each upper and lower transistor, of each rectifier-inverter of each AC electrical phase, are turned on during respectively first and second one hundred and eighty degree half portions of a full cycle of an AC electrical phase of an AC electrical signal. Synchronous rectification is performed for a first one hundred and eighty degrees of phase of an AC electrical signal of an AC electrical phase when the AC electrical signal forward biases a first diode, e.g., the upper or the lower diode, of a rectifier of the AC electrical phase, and thus turns on a first transistor, e.g., the upper or the lower transistor, and for the second one hundred and eighty degrees of phase for the AC electrical signal of the AC electrical phase when the AC electrical signal forward biases a second diode, e.g., respectively the lower or the upper diode, of the rectifier for the AC electrical phase, and thus turns on a second transistor, e.g., respectively the lower or the upper transistor.

When operating as a rectifier and providing direct current with in the highest direct current range 300D-3 and the third voltage range $VR_3$, the modified converter 208 employs fully synchronous rectification 300C. The PMG DC voltage output $V_{PMG}$, e.g., 30V, is not reduced by diode forward voltage drop(s) because rectification is provided by both transistors in each rectifier inverter of the modified converter 208. Thus, in the fully synchronous rectification mode, the rectifier DC output voltage $V_R$, at the DC input/output 207, of the modified converter (when operating as a rectifier) is the PMG DC voltage output $V_{PMG}$. In fully passive rectification 300A, an electrical load line at the DC input/output 207 of the modified converter 208 (when operating as a rectifier) is an internal impedance of the PMG 106. Because the highest direct current range 300D-3 commences at a direct current level

[2] Turning on a second transistor diode pair of which the second diode is part and which is part of the rectifier inverter. higher than the direct current level corresponding to the onset of a diode being forward biased, the highest DC voltage, e.g., the fourth voltage threshold level $Vt_4$, of the third voltage range $VR_3$ (corresponding to the highest direct current range 300D-3) is less than $V_{PMG}$ due to the fully synchronous load line 300C-1. In fully synchronous rectification 300C, the fully synchronous load line 300C-1 at the DC input/output 207 of the modified converter 208 (when operating as a rectifier) is about an internal impedance of the PMG 106.

When only two states, fully passive rectification and fully synchronous rectification, are used, then only the minimum current threshold level Imin, the first current threshold level It1, and the maximum current threshold level Imax, and/or voltage levels defining the first voltage range $VR_1$ and the third voltage range $VR_3$, need be used. For only two states, the first current threshold level It1 demarks where the lowest current range (corresponding to fully passive rectification) ends and the highest current range (corresponding to fully synchronous rectification) begins. For only two states, optionally, the first voltage threshold level $Vt_1$ and the fourth voltage threshold level $Vt_4$ demark where the first voltage range $VR_1$ ends and the third voltage range $VR_3$ begins. The inverter/rectifier controller 222A is configured to store the aforementioned current threshold levels. For purposes of clarity, current levels in the lowest current range are less than current levels in either of the middle current range or the highest current range; current levels in the middle current range are less than current levels in the highest current range.

Optionally, the modified converter 208, e.g., the inverter/rectifier controller 222A, stores the mode of rectification that the modified converter 208 is performing rectification. Optionally, the modified converter 208 is configured to initially operate in a fully passive rectification mode. The modified converter 208, e.g., the inverter/rectifier controller 222A, is configured to change the rectification mode from:
  (a) fully synchronous rectification 300C to either partially passive-partially synchronous rectification 300B or fully passive rectification 300A when a direct current level drawn from the DC input/output 207 is less than a direct current threshold level, e.g., the second direct current threshold level It2, of the fully synchronous rectification 300C having the lowest direct current level and/or a DC voltage level at the DC input/output 207 is greater than a DC voltage threshold level, e.g., the fourth voltage threshold level $Vt_4$, of the fully synchronous rectification 300C having the highest DC voltage level;
  (b) partially passive-partially synchronous rectification 300B to fully passive rectification 300A when a direct current level drawn from the DC input/output 207 is less than the direct current threshold level, e.g., the first direct current threshold level It1, of the partially passive-partially synchronous rectification 300B having the lowest direct current level and/or a DC voltage level at the DC input/output 207 is greater than a DC voltage threshold level, e.g., the second voltage threshold level $Vt_2$, of the fully synchronous rectification 300C having the highest DC voltage level;
  (c) partially passive-partially synchronous rectification 300B to fully synchronous rectification 300C when a direct current level drawn from the DC input/output 207 is greater than the direct current threshold level, e.g., the second direct current threshold level It2, of the partially passive-partially synchronous rectification 300B having the highest direct current level and/or a DC voltage level at the DC input/output 207 is less than a DC voltage threshold level, e.g., the third voltage threshold level $Vt_3$, of the partially passive-partially synchronous rectification 300B having the lowest DC voltage level; and
  (d) fully passive rectification 300A to either fully synchronous rectification 300C or partially passive-partially synchronous rectification 300B when a direct current level drawn from the DC input/output 207 is greater than a direct current threshold level, e.g., the first direct current threshold level It1, of the fully passive rectification 300A having the highest direct current level and/or a DC voltage level at the DC input/output 207 is less than a DC voltage threshold level, e.g., the first voltage threshold level $Vt_1$, of the fully passive rectification 300A having the lowest DC voltage level.

Returning to FIG. 2, the modified converter 108 is configured to generate or receive at least two AC electrical phases, e.g., 2 to 6 AC electrical phases. Each AC electrical phase comprises an AC electrical signal that is sinusoidal ($\sin(\Omega^*+\varphi)$, $\Omega$ is frequency, t is time, and $\varphi$ is relative phase. Relative phase for an AC electrical phase equals (n−1)*360 degrees/N, where N is a total number of AC electrical phases, e.g., 2 to 6 AC electrical phases, and n is a positive integer commencing with one and which indicates a relative order of the AC electrical phase. Thus, for three AC electrical phases, N=3: AC electrical phase 1 (n=1) has a relative phase of 0 degrees, AC electrical phase 2 (n=2) has a relative phase of 120 degrees, and AC electrical phase 3 (n=3) has a relative phase of 240 degrees.

FIG. 2 illustrates a modified converter 208 configured to generate or receive three AC electrical phases: a first AC electrical phase P1, a second AC electrical phase P2, and a third AC electrical phase P3. The AC input/output 205, of the modified converter 208 illustrated in FIG. 2, comprises the three AC electrical phases (the first AC electrical phase P1, the second AC electrical phase P2, and the third AC electrical phase P3).

Each AC electrical phase is generated or received by a corresponding rectifier/inverter. The illustrated modified converter 108 generates or receives three AC electrical phases, and comprises a first rectifier inverter R/I1, a second rectifier inverter R/I2, and a third rectifier inverter R/I3. Each rectifier inverter R/In comprises an upper transistor diode pair (QUn/DUn) electrically coupled in series with a lower transistor diode pair (QLn/DLn). A first DC terminal T1 is formed by electrically coupling the cathode terminals of each of either diodes of the upper transistor diode pairs or the lower transistor diode pairs. A second DC terminal T2 is formed by electrically coupling the anode terminals of each of either diodes of respectively the lower transistor diode pairs or the upper transistor diode pairs. For pedagogical purposes, the first DC terminal T1 is illustrated in FIG. 2 as being formed by the upper transistor diode pairs, and the second DC terminal T2 is illustrated in FIG. 2 as being formed by the lower transistor diode pairs. The DC input/output 207, of the modified converter 208 illustrated in FIG. 2, comprises the first DC terminal T1 and the second DC terminal T2.

Optionally, a filter 225 may be electrically coupled to the first DC terminal T1 and the second DC terminal T2 to filter, e.g., reduce ripple in, the DC electrical power produced or received at the first DC terminal T1 and the second DC terminal T2. Optionally, the filter 225 may comprise a capacitor and an optional resistor (used to bleed charge from the capacitor) both of which are electrically coupled in parallel across the first DC terminal T1 and the second DC terminal T2; the filter 225 may also optionally comprise an inductance in the PMG 106 which is effectively serially coupled to one terminal of the filter 225, e.g., the capacitor and the optional resistor.

Each upper transistor diode pair comprises an upper transistor QUn (whose non-control terminals are) electrically coupled in parallel with an upper diode DUn. Each lower transistor diode pair comprises a lower transistor QLn (whose non-control terminals are) electrically coupled in parallel with a lower diode DLn. The AC electrical input/output of each rectifier inverter R/In is provided where the upper transistor diode pair is electrically serially coupled to the lower transistor diode pair, and thus where one of the first AC electrical phase P1, second AC electrical phase P2, and third AC electrical phase P3 is produced or received. The DC electrical input/output of each rectifier inverter R/In is at the anode of the upper diode DUn and the cathode of the lower diode DLn of the rectifier inverter R/In. Optionally, each rectifier inverter is implemented with a same type of upper transistor, upper diode, lower transistor, and lower diode. Optionally, each rectifier inverter is implemented with the same transistors and diodes; for pedagogical purposes, the modified converter 208 is described as if this were the case.

Each transistor of each rectifier inverter R/In may be a field effect transistor (FET), e.g., a metal oxide semiconductor (MOS) FET, a bipolar junction transistor (e.g., an insulated gate bipolar transistor (IGBT)), or another type of transistor. For pedagogical purposes, FIG. 1 illustrates three upper transistors (a first upper transistor QU1, a second upper transistor QU2, and a third upper transistor QU3) and three lower transistors (a first lower transistor QL1, a second lower transistor QL2, and a third lower transistor QL3). For pedagogical purposes, the transistors illustrated in FIG. 2 are n-type MOSFETs.

For pedagogical purposes, FIG. 2 illustrates three upper diodes (a first upper diode DU1, a second upper diode DU2, and a third upper diode DU3) and three lower diodes (a first lower diode DL1, a second lower diode DL2, and a third lower diode DL3). The anode and cathode of each diode are each electrically coupled to an unique, non-control terminal of a transistor.

The diode of each rectifier inverter R/In may be a body diode of the transistor, e.g., a MOSFET, which is a parasitic electronic device intrinsic to the implementation of the transistor. Alternatively, the diode of each rectifier may be an external, or non-intrinsic, diode when the transistor, e.g., an IGBT, has no body diode. The diode has a junction voltage, e.g., from 0.3 to 1V, whose value depends upon materials used to form the diode.

An inverter/rectifier controller 222A is electrically coupled to a control node (e.g., a gate or a base) of each transistor. For pedagogical purposes, the control nodes illustrated in FIG. 2 are illustrated as gates of MOSFETs; however, the control nodes may differ based upon type of transistor, and for example could be a base for a bipolar junction transistor. Under certain circumstance (described elsewhere herein), the inverter/rectifier controller 222A is configured to enable a transistor to be switched on (e.g., relatively low impedance) and off (e.g., relatively high impedance) by providing a control signal to a driver which selectively biases a control node of the transistor.

A driver (or driver circuitry) is electrically coupled between the inverter/rectifier controller 222A and each transistor diode pair. Each driver is configured to be electrically coupled to a control node of a transistor a corresponding transistor diode pair, and to an anode and to a cathode of a diode of the corresponding transistor diode pair. The driver is configured to receive a control signal from the inverter/rectifier controller indicating when the corresponding transistor diode pair is to operate passively, or synchronously (to facilitate synchronous or partial synchronous rectification by the modified converter as explained elsewhere herein). If the driver is commanded by the inverter/rectifier controller 222A to operate synchronously, then the driver is configured to detect when the diode of the corresponding transistor diode pair is forward biased, e.g., having a forward voltage drop of 0.3-1V. Upon detecting that the diode is forward biased, the driver biases the control node of the transistor so as to turn the transistor on. When turning the transistor on, more current flows through the transistor than through the diode, e.g., because an impedance between the non-control nodes of the transistor in parallel to the anode and the cathode of the diode is lower than an impedance between the anode and the cathode. As a result, the voltage drop across the anode and cathode of the diode is reduced to substantially zero volts. Upon detecting that the diode is no longer forward biased, e.g., no longer has a forward voltage drop of 0.3-1V, then the driver biases the control node of the transistor so as to turn the transistor off. When turning the transistor off, more current flows the diode than through the transistor, e.g., an impedance between the non-control nodes of the transistor in parallel to the anode and the cathode of the diode is higher than an impedance between the anode and the cathode. For pedagogical purposes, FIG. 2 illustrates a first driver (driver 1) 224A, a second driver (driver 2) 224B, a third driver (driver 3) 224C, a fourth driver (driver 4) 224D, a fifth driver (driver 5) 224E, and a sixth driver (driver 6) 224F which are respectively electrically coupled to a control node of the first upper transistor QU1, a control node of the first lower transistor QL1, a control node of the second upper transistor QU2, a control node of the second lower transistor QL1, a control node of the third upper transistor QU3, and a control node of the third lower transistor QL3.

Optionally, the inverter/rectifier controller 222A is configured to be electrically coupled to the first node N1 and the second node N2 which are each electrically coupled to a different terminal of the DC input/output 105 of the of the modified converter 108. The inverter/rectifier controller 222A is configured to measure a DC voltage across the first node N1 and the second node N2. Alternatively and optionally, a voltage sensor (or voltage sensor circuitry) may be employed external to the inverter/rectifier controller 222A internal to or external to the modified converter 208; such a voltage sensor is configured to measure the voltage across the first node N2 and the second node N2.

If the inverter/rectifier controller 222A is configured to receive or determine a DC voltage at the DC input/output 205 of the modified converter 208 and a battery 110 is employed, the inverter/rectifier controller 222A can compare that the DC voltage at the DC input/output 205 (and thus across the battery 110) with a battery threshold voltage. If the DC voltage at the DC input/output 205 (and thus across the battery 110) exceeds the battery threshold voltage, the inverter/rectifier controller 222A can communicate a control signal to the ECU 104 to reduce the rotation rate of the PMG 106 so that the AC voltage generated by the PMG 106 is reduced and thus that the DC voltage across the battery 110 is reduced below the battery threshold voltage. A DC voltage in excess of the battery threshold voltage can cause the battery 110 to be damaged, e.g., to dry out. One embodiment of operation of the modified converter 208 functioning as a rectifier is subsequently illustrated.

Figure 4:
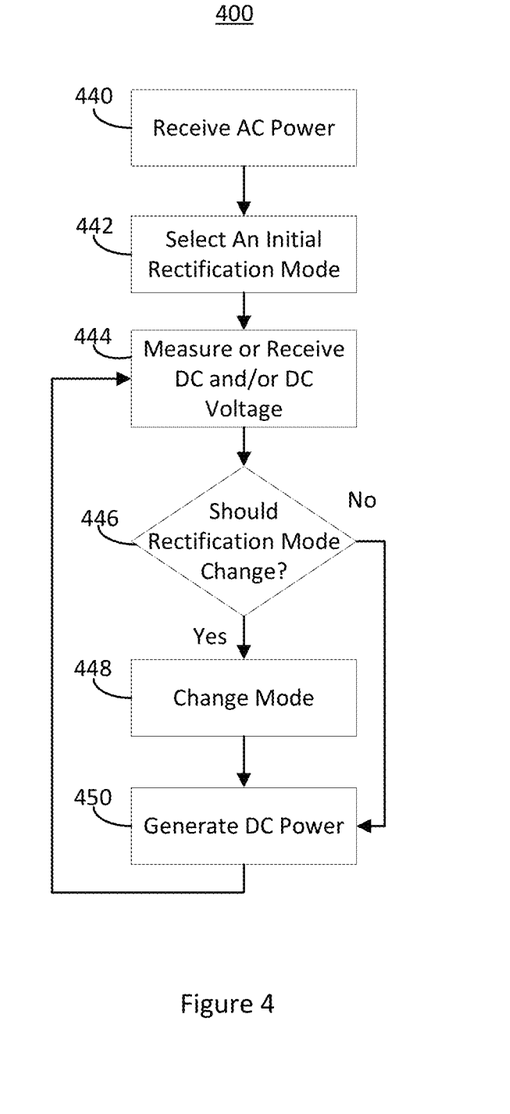
FIG. 4 illustrates a flow diagram of one embodiment of a method of operation of the modified converter operating as a rectifier comprising at least two AC electrical phases.

FIG. 4 illustrates a flow diagram of one embodiment of a method 400 of operation of the modified converter 208 operating as a rectifier comprising at least two AC electrical phases; each AC electrical phase comprises an upper transistor diode pair electrically coupled in series with a lower transistor diode pair. For each transistor diode pair, the anode and cathode of the diode are each coupled to a different non-control terminal of the transistor. Because the modified converter 208 is operated as a rectifier, for purposes of FIG. 4 it is referred to as a rectifier.

To the extent that the embodiment of method 400 shown in FIG. 4 is described herein as being implemented in an apparatus shown in FIGS. 1 and 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

Optionally, in block 440, AC power (comprising of at least two AC electrical phases wherein each AC electrical phase has an identical AC voltage waveform that differs only in phase) is received, e.g., by modified converter 108 operating as a rectifier (or the "rectifier") from a PMG 106. Optionally, a signal is sent to the ECU 104, e.g., by the modified converter 108, to adjust a voltage of the AC electrical phases provided by the PMG 106 to rectifier. Optionally, the PMG 106 is mechanically rotated with the auxiliary power unit 102.

In block 442, an initial mode of rectification of the rectifier is selected, e.g., by the rectifier. Optionally, the initial mode of rectification is fully passive rectification, however, the initial mode of rectification may be another mode of rectification. Thus, optionally, the rectifier initially operates in the initial mode of rectification.

In block 444, an output direct current level, e.g., drawn from the DC input/output 107 of the modified converter 108, and/or an output DC voltage level, e.g., across the DC input/output 107 of the modified converter 108, is measured or received, e.g., by the rectifier, e.g., the inverter/rectifier controller 222A. Optionally, the output direct current level is measured by the current sensor CS. Optionally, the output DC voltage level is measured by the voltage sensor VS.

In block 446, whether a previously selected mode of rectification should be changed to another mode of rectification is determined based upon whether the output direct current level is within a range of direct current levels corresponding to the other mode of rectification, and/or based upon whether the output DC voltage is greater than a highest voltage threshold level of the previously selected mode of rectification or lower than a lowest voltage threshold level of the previously selected mode of rectification. Optionally, the other mode of rectification comprises one of fully passive or fully synchronous. Optionally, the other mode of rectification comprises one of fully passive, partially passive-partially synchronous, or fully synchronous.

If it is determined that the previously selected mode of rectification should be changed, then, in block 448, the mode of rectification, e.g., of the rectifier, is changed to the other mode. Then, in optional block 450, DC power is generated, e.g., at the DC input/output 107 of the modified converter 108, using the other mode of rectification of the rectifier. Optionally, DC power is not provided at the DC input/output 107 by the modified converter 108 until a frequency of each AC electrical phase of the AC power, e.g., provided by a PMG, is within a frequency range, e.g., 1200-1400 Hz.

If it is determined that the previously selected mode of rectification should not be changed, then, proceed to blocks 444 or 450, e.g., at the DC input/output 107 of the modified converter 108, using the previously selected mode of rectification of the rectifier. Optionally, after performing block 446, 448, or 450, proceed to block 444.

Commutate at a frequency of an AC electrical phase of an AC electrical signal means that each of one set of electronic devices, (e.g., for passive rectification, either upper or lower diodes (or, for synchronous rectification, both a transistor and diode of an upper or lower transistor diode pair) of each rectifier inverter of the rectifier, are sequentially turned on and off when a corresponding diode is forward biased. Thus, when a transistor diode pair is operated in a passive mode (for the fully passive mode or the partially synchronous mode), the diode of the transistor diode pair is commutated at a frequency of the AC electrical phase corresponding to the transistor diode pair. When a transistor diode pair is operated in a synchronous mode (for the fully synchronous mode or the partially synchronous mode), the transistor and the diode of the transistor diode pair are commutated at a frequency of the AC electrical phase corresponding to the transistor diode pair.

For example, an upper diode of a second rectifier inverter corresponding to a second AC electrical phase is turned on about 360 degrees/2*N after an upper diode phase of a first rectifier inverter corresponding to a first AC electrical phase is turned on, where N is a number of AC electrical phases; when the upper diode of the second rectifier is turned on, the upper diode of the first rectifier has already been turned off. An upper diode of a third rectifier inverter corresponding to a third AC electrical phase is turned on about 360 degrees/2*N after an upper diode phase of the second rectifier inverter is turned on; when the upper diode of the third rectifier is turned on, the upper diode of the second rectifier has already been turned off. In block 448, the rectifier generates, using the selected mode, DC electrical power from the AC electrical power.

Terms of relative position used in this application are defined based on a plane parallel to, or in the case of the term coplanar—the same plane as, the conventional plane or working surface of a device, layer, wafer, or substrate, regardless of orientation. The term "horizontal" or "lateral" as used in this application are defined as a plane parallel to the conventional plane or working surface of a device, layer, wafer, or substrate, regardless of orientation. The term "vertical" refers to a direction perpendicular to the horizontal. Terms such as "on," "side" (as in "sidewall"), "higher," "lower," "over," "top," and "under" are defined with respect to the conventional plane or working surface being on the top surface of a device, layer, wafer, or substrate, regardless of orientation. The term "coplanar" used in this application is defined as a plane in the same plane as the conventional plane or working surface of a device, layer, wafer, or substrate, regardless of orientation.

Several examples defined by the following claims have been described. Nevertheless, it will be understood that various modifications to the described examples may be made without departing from the spirit and scope of the claimed invention. Therefore, it is manifestly intended that this invention be limited only by the claims and the equivalents thereof.

In various alternative embodiments, system elements, method steps, or examples described throughout this disclosure (such as the inverter/rectifier controller 222A or sub-parts thereof, for example) may be implemented on one or more processor circuits and/or memory circuits, field programmable gate array (FPGA), applications specific integrated circuits, or similar devices comprising a processor executing code to realize those elements, processes, or examples, said code stored on a non-transient data storage device, e.g. memory circuitry. Therefore, other embodiments of the present disclosure may include elements comprising program instructions resident on computer-readable media which, when implemented by such computer systems, enable them to implement the embodiments described herein. As used herein, the term "computer-readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to, computer-executable instructions executed by computer system processors and hardware description languages such as Very High Speed Integrated Circuit (VHSIC) Hardware Description Language (VHDL).

Example Embodiments

Example 1 include an apparatus for providing electrical rectification, comprising: at least two sets, wherein each set comprises a first transistor diode pair serially electrically coupled to a second transistor diode pair, wherein each transistor diode pair comprises a transistor and a diode, wherein an anode of the diode is electrically coupled to a first non-control node of the transistor, a cathode of the diode is electrically coupled to a second non-control node of the transistor, wherein, for each set, a cathode of a diode of the first transistor diode pair is electrically coupled to an anode of a diode of the second transistor diode pair, and wherein each set is configured to receive an unique alternating current (AC) electrical phase, of an AC electrical power; at least two groups, wherein each group comprises a first driver circuit and a second driver circuit, wherein each first driver circuit of a group is electrically coupled to a control terminal of a transistor of the first transistor diode pair of an unique set, and to an anode and to a cathode of a diode of the first transistor diode pair of the unique set, and wherein each second driver circuit of a group is electrically coupled to a control terminal of a transistor of the second transistor diode pair of the unique set, and to an anode and to a cathode of a diode of the second transistor diode pair of the unique set; wherein the cathode, of the diode of the second transistor diode pair of each set are electrically coupled, wherein the anode, of the diode of the first transistor diode pair of each set are electrically coupled, and wherein each set is configured to generate a direct current (DC) electrical power across the electrically coupled cathodes of diodes of second transistor diode pairs and the electrically coupled anodes of diodes of first transistor diode pairs; and a control circuit, wherein the control circuit is configured to: select an initial mode of rectification, wherein modes of rectification comprise fully passive rectification and fully synchronous rectification; receive or measure at least one of: (a) a level of a direct current generated by the at least two sets and (b) a level of a DC voltage generated by the at least two sets; determine whether a previously selected mode of rectification should be changed to another mode of rectification based upon at least one of: (x) whether the level of direct current is within a range of direct current levels corresponding to the other mode of rectification and (y) whether the level of the DC voltage is greater than a highest voltage threshold level of the previously selected mode of rectification, or lower than a lowest voltage threshold level of the previously selected mode of rectification; determining that the previously selected mode of rectification should be changed, then causing the previously selected mode of rectification to be changed to the other mode of rectification; upon initially selecting the initial mode of rectification that is the fully passive rectification or changing the previously selected mode of rectification to the fully passive rectification, send a first signal to each driver circuit to cause to turn off a transistor of each first transistor diode pair and a transistor of each second transistor diode pair so that the diode, and not the transistor, of each first transistor diode pair and the diode, and not the transistor, of each second transistor diode pair are commutated at a frequency of a corresponding AC electrical phase; and upon initially selecting the initial mode of rectification that is the fully synchronous rectification or changing the previously selected mode of rectification to the fully passive rectification, send a second signal to each driver circuit to cause to turn on the transistor of each first transistor diode pair and the transistor of each second transistor diode pair so that the diode and the transistor of each first transistor diode pair and of each second transistor diode pair are commutated at the frequency of the corresponding AC electrical phase.

Example 2 includes the apparatus of Example 1, wherein the modes of rectification comprise the fully passive rectification, partially passive-partially synchronous rectification, and the fully synchronous rectification; and upon initially selecting the initial mode of rectification that is the partially passive-partially synchronous rectification or changing the previously selected mode of rectification to the partially passive-partially synchronous rectification, send the first signal to each driver circuit electrically coupled to the first transistor diode pair of each set or to each driver circuit electrically coupled to the second transistor diode pair of each set to cause to turn off respectively the transistor of each first transistor diode pair or the transistor of each second transistor diode pair so that respectively the diode, and not the transistor, of each first transistor diode pair or the diode, and not the transistor, of each second transistor diode pair are commutated at the frequency of the corresponding AC electrical phase, and sending the second signal to each driver circuit electrically coupled respectively to the second transistor diode pair of each set or to each driver circuit electrically coupled to the first transistor diode pair of each set to cause to turn on respectively the transistor of each second transistor diode pair or the transistor of each first transistor diode pair so that respectively the diode and the transistor of each second transistor diode pair or the transistor of each first transistor diode pair are commutated at the frequency of the corresponding AC electrical phase.

Example 3 includes the apparatus of any of Examples 1-2, further comprising a filter circuit configured to reduce ripple and electrically coupled across the electrically coupled cathodes of the diodes of the second transistor diode pairs and the electrically coupled anodes of the diodes of the first transistor diode pairs.

Example 4 includes the apparatus of any of Examples 1-13, wherein each transistor is a metal oxide semiconductor field effect (MOSFET) transistor, and each diode is a body diode of a MOSFET transistor.

Example 5 includes the apparatus of any of Examples 1-4, further comprising a permanent magnet generator (PMG) configured to provide an unique AC electrical phase to each set.

Example 6 includes the apparatus of Example 5, further comprising a battery.

Example 7 includes the apparatus of any of Examples 5-6, further comprising: an auxiliary power unit (APU) mechanically and rotationally coupled to the PMG; and an engine control circuit (ECC) electrically coupled to the control circuit and the APU, and configured to control a rotation rate of the APU.

Example 8 includes the apparatus of any of Examples 5-7, wherein the PMG is configured to mechanically and rotationally propel the APU.

Example 9 includes the apparatus of any of Examples 7-8, wherein the control circuit is further configured to send a third signal to the ECC to adjust a voltage of AC electrical phases provided by the PMG to a corresponding set.

Example 10 includes the apparatus of any of Examples 1-9, further comprising current measurement circuitry configured to measure the direct current level flowing from the at least two sets, and configured to provide the measured direct current level to the control circuit.

Example 11 includes the apparatus of any of Examples 1-10, voltage measurement circuitry configured to measure a voltage level of the DC electrical power.

Example 12 includes a method for operating a rectifier comprising at least two sets, the method comprising: receiving an alternating current (AC) electrical power, comprising at least two AC electrical phases, from a permanent magnet generator (PMG), wherein each set comprises a first transistor diode pair serially electrically coupled to a second transistor diode pair, wherein each set is configured to receive an unique AC electrical phase of the AC electrical power; selecting an initial mode of rectification, wherein modes of rectification comprise fully passive rectification and fully synchronous rectification; receiving or measuring at least one of: (a) a level of a direct current generated by the at least two sets and (b) a level of a direct current (DC) voltage generated by the at least two sets; determining whether a previously selected mode of rectification should be changed to another mode of rectification based upon at least one of: (x) whether the level of direct current is within a range of direct current levels corresponding to the other mode of rectification and (y) whether the level of the DC voltage is greater than a highest voltage threshold level of the previously selected mode of rectification, or lower than a lowest voltage threshold level of the previously selected mode of rectification; determining that the previously selected mode of rectification should be changed to the other mode of rectification, then causing the previously selected mode of rectification to be changed to the other mode of rectification; upon initially selecting the initial mode of rectification that is the fully passive rectification or changing the previously selected mode of rectification to the fully passive rectification, sending a first signal to each driver circuit to cause to turn off a transistor of each first transistor diode pair and a transistor of each second transistor diode pair so that a diode, and not a transistor, of each first transistor diode pair and a diode, and not a transistor, of each second transistor diode pair are commutated at a frequency of a corresponding AC electrical phase; upon initially selecting the initial mode of rectification that is the fully synchronous rectification or changing the previously selected mode of rectification to the fully passive rectification, sending a second signal to each driver circuit to cause to turn on the transistor of each first transistor diode pair and the transistor of each second transistor diode pair so that the diode and the transistor of each first transistor diode pair and of each second transistor diode pair are commutated at the frequency of the corresponding AC electrical phase; and generating DC electrical power from the at least two sets.

Example 13 includes the method of Example 12, further comprising filtering the DC electrical power generated by the rectifier.

Example 14 includes the method of any of Examples 12-13, further comprising: upon initially selecting the initial mode of rectification that is a partially passive-partially synchronous rectification or changing the previously selected mode of rectification to the partially passive-partially synchronous rectification, sending the first signal to cause to turn off respectively the transistor of each first transistor diode pair or the transistor of each second transistor diode pair so that respectively the diode, and not the transistor, of each first transistor diode pair or the diode, and not the transistor, of each second transistor diode pair are commutated at the frequency of the corresponding AC electrical phase, and sending the second signal to cause to turn on respectively the transistor of each second transistor diode pair or the transistor of each first transistor diode pair so that respectively the diode and the transistor of each second transistor diode pair or the diode and the transistor of each first transistor diode pair are commutated at the frequency of the corresponding AC electrical phase; wherein the modes of rectification comprise the fully passive rectification, the partially passive-partially synchronous rectification, and the fully synchronous rectification.

Example 15 includes the method of any of Examples 12-14, further comprising sending a third signal to an engine control circuit to adjust a voltage of the at least two AC electrical phases provided by the PMG to rectifier.

Example 16 includes the method of any of Examples 12-15, further comprising mechanically rotating the PMG with an auxiliary power unit.

Example 17 includes a program product comprising a non-transitory processor readable medium on which program instructions are embodied, wherein the program instructions are configured, when executed by at least one programmable processor, to cause the at least one programmable processor to: select an initial mode of rectification, wherein modes of rectification comprise fully passive rectification and fully synchronous rectification; receive at least one of: (a) a level of a direct current generated by at least two sets and (b) a level of a direct current (DC) voltage generated by at least two sets, wherein each set comprises a first transistor diode pair serially electrically coupled with a second transistor diode pair, and wherein each set is configured to receive an unique alternating current (AC) electrical phase of AC electrical power; determine whether a previously selected mode of rectification should be changed to another mode of rectification based upon at least one of: (x) whether the level of direct current is within a range of direct current levels corresponding to the other mode of rectification and (y) whether the level of the DC voltage is greater than a highest voltage threshold level of the previously selected mode of rectification, or lower than a lowest voltage threshold level of the previously selected mode of rectification; determine that the previously selected mode of rectification should be changed to the other mode of rectification, then causing the previously selected mode of rectification to be changed to the other mode of rectification; upon initially selecting the initial mode of rectification that is the fully passive rectification or changing the previously selected mode of rectification to the fully passive rectification, send a first signal to cause to turn off a transistor of each first transistor diode pair and a transistor of each second transistor diode pair so that a diode, and not a transistor, of each first transistor diode pair and a diode, and not a transistor, of each second transistor diode pair are commutated at a frequency of a corresponding AC electrical phase; and upon initially selecting the initial mode of rectification that is the fully synchronous rectification or changing the previously selected mode of rectification to the fully passive rectification, send a second signal to cause to turn on the transistor of each first transistor diode pair and the transistor of each second transistor diode pair so that the diode and the transistor of each first transistor diode pair and of each second transistor diode pair are commutated at the frequency of the corresponding AC electrical phase.

Example 18 includes the program product of Example 17, wherein the program instructions are further configured, when executed by the at least one programmable processor, to cause the at least one programmable processor to: upon initially selecting the initial mode of rectification that is a partially passive-partially synchronous rectification or changing the previously selected mode of rectification to the partially passive-partially synchronous rectification, send the first signal to cause to turn off respectively the transistor of each first transistor diode pair or the transistor of each second transistor diode pair so that respectively the diode, and not the transistor, of each first transistor diode pair or the diode, and not the transistor, of each second transistor diode pair are commutated at the frequency of the corresponding AC electrical phase, and send the second signal to cause to turn on respectively the transistor of each second transistor diode pair or the transistor of each first transistor diode pair so that respectively the diode and the transistor of each second transistor diode pair or the diode and the transistor of each first transistor diode pair are commutated at the frequency of the corresponding AC electrical phase; wherein the modes of rectification comprise the fully passive rectification, partially passive-partially synchronous rectification, and the fully synchronous rectification.

Example 19 includes the program product of any of Examples 17-18, wherein the program instructions are further configured, when executed by the at least one programmable processor, to cause the at least one programmable processor to send a third signal to an engine control circuit to adjust a voltage of AC electrical phases provided by a permanent magnet generator to rectifier.

Example 20 includes the program product of any of Examples 17-19, wherein the program instructions are further configured, when executed by the at least one programmable processor, to cause the at least one programmable processor to receive the DC voltage level from DC voltage measurement circuitry.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An apparatus for providing electrical rectification, comprising:
    at least two sets, wherein each set comprises a first transistor diode pair serially electrically coupled to a second transistor diode pair, wherein each transistor diode pair comprises a transistor and a diode, wherein an anode of the diode is electrically coupled to a first non-control node of the transistor, a cathode of the diode is electrically coupled to a second non-control node of the transistor, wherein, for each set, a cathode of a diode of the first transistor diode pair is electrically coupled to an anode of a diode of the second transistor diode pair, and wherein each set is configured to receive an unique alternating current (AC) electrical phase, of an AC electrical power;
    at least two groups, wherein each group comprises a first driver circuit and a second driver circuit, wherein each first driver circuit of a group is electrically coupled to a control terminal of a transistor of the first transistor diode pair of an unique set, and to an anode and to a cathode of a diode of the first transistor diode pair of the unique set, and wherein each second driver circuit of a group is electrically coupled to a control terminal of a transistor of the second transistor diode pair of the unique set, and to an anode and to a cathode of a diode of the second transistor diode pair of the unique set;

wherein the cathode, of the diode of the second transistor diode pair of each set are electrically coupled, wherein the anode, of the diode of the first transistor diode pair of each set are electrically coupled, and wherein each set is configured to generate a direct current (DC) electrical power across the electrically coupled cathodes of diodes of second transistor diode pairs and the electrically coupled anodes of diodes of first transistor diode pairs; and a control circuit, wherein the control circuit is configured to:
  select an initial mode of rectification, wherein modes of rectification comprise fully passive rectification and fully synchronous rectification;
  receive or measure at least one of: (a) a level of a direct current generated by the at least two sets and (b) a level of a DC voltage generated by the at least two sets;
  determine whether a previously selected mode of rectification should be changed to another mode of rectification based upon at least one of: (x) whether the level of direct current is within a range of direct current levels corresponding to the other mode of rectification and (y) whether the level of the DC voltage is greater than a highest voltage threshold level of the previously selected mode of rectification, or lower than a lowest voltage threshold level of the previously selected mode of rectification;
  determining that the previously selected mode of rectification should be changed, then causing the previously selected mode of rectification to be changed to the other mode of rectification;
  upon initially selecting the initial mode of rectification that is the fully passive rectification or changing the previously selected mode of rectification to the fully passive rectification, send a first signal to each driver circuit to cause to turn off a transistor of each first transistor diode pair and a transistor of each second transistor diode pair so that the diode, and not the transistor, of each first transistor diode pair and the diode, and not the transistor, of each second transistor diode pair are commutated at a frequency of a corresponding AC electrical phase; and
  upon initially selecting the initial mode of rectification that is the fully synchronous rectification or changing the previously selected mode of rectification to the fully passive rectification, send a second signal to each driver circuit to cause to turn on the transistor of each first transistor diode pair and the transistor of each second transistor diode pair so that the diode and the transistor of each first transistor diode pair and of each second transistor diode pair are commutated at the frequency of the corresponding AC electrical phase.

2. The apparatus of claim 1, wherein the modes of rectification comprise the fully passive rectification, partially passive-partially synchronous rectification, and the fully synchronous rectification; and upon initially selecting the initial mode of rectification that is the partially passive-partially synchronous rectification or changing the previously selected mode of rectification to the partially passive-partially synchronous rectification, send the first signal to each driver circuit electrically coupled to the first transistor diode pair of each set or to each driver circuit electrically coupled to the second transistor diode pair of each set to cause to turn off respectively the transistor of each first transistor diode pair or the transistor of each second transistor diode pair so that respectively the diode, and not the transistor, of each first transistor diode pair or the diode, and not the transistor, of each second transistor diode pair are commutated at the frequency of the corresponding AC electrical phase, and sending the second signal to each driver circuit electrically coupled respectively to the second transistor diode pair of each set or to each driver circuit electrically coupled to the first transistor diode pair of each set to cause to turn on respectively the transistor of each second transistor diode pair or the transistor of each first transistor diode pair so that respectively the diode and the transistor of each second transistor diode pair or the transistor of each first transistor diode pair are commutated at the frequency of the corresponding AC electrical phase.

3. The apparatus of claim 1, further comprising a filter circuit configured to reduce ripple and electrically coupled across the electrically coupled cathodes of the diodes of the second transistor diode pairs and the electrically coupled anodes of the diodes of the first transistor diode pairs.

4. The apparatus of claim 1, wherein each transistor is a metal oxide semiconductor field effect (MOSFET) transistor, and each diode is a body diode of a MOSFET transistor.

5. The apparatus of claim 1, further comprising a permanent magnet generator (PMG) configured to provide an unique AC electrical phase to each set.

6. The apparatus of claim 5, further comprising a battery.

7. The apparatus of claim 5, further comprising:
  an auxiliary power unit (APU) mechanically and rotationally coupled to the PMG; and
  an engine control circuit (ECC) electrically coupled to the control circuit and the APU, and configured to control a rotation rate of the APU.

8. The apparatus of claim 7, wherein the PMG is configured to mechanically and rotationally propel the APU.

9. The apparatus of claim 7, wherein the control circuit is further configured to send a third signal to the ECC to adjust a voltage of AC electrical phases provided by the PMG to a corresponding set.

10. The apparatus of claim 1, further comprising current measurement circuitry configured to measure the direct current level flowing from the at least two sets, and configured to provide the measured direct current level to the control circuit.

11. The apparatus of claim 1, voltage measurement circuitry configured to measure a voltage level of the DC electrical power.

12. A method for operating a rectifier comprising at least two sets, the method comprising:
  receiving an alternating current (AC) electrical power, comprising at least two AC electrical phases, from a permanent magnet generator (PMG), wherein each set comprises a first transistor diode pair serially electrically coupled to a second transistor diode pair, wherein each set is configured to receive an unique AC electrical phase of the AC electrical power;

selecting an initial mode of rectification, wherein modes of rectification comprise fully passive rectification and fully synchronous rectification;

receiving or measuring at least one of: (a) a level of a direct current generated by the at least two sets and (b) a level of a direct current (DC) voltage generated by the at least two sets;

determining whether a previously selected mode of rectification should be changed to another mode of rectification based upon at least one of: (x) whether the level of direct current is within a range of direct current levels corresponding to the other mode of rectification and (y) whether the level of the DC voltage is greater than a highest voltage threshold level of the previously selected mode of rectification, or lower than a lowest voltage threshold level of the previously selected mode of rectification;

determining that the previously selected mode of rectification should be changed to the other mode of rectification, then causing the previously selected mode of rectification to be changed to the other mode of rectification;

upon initially selecting the initial mode of rectification that is the fully passive rectification or changing the previously selected mode of rectification to the fully passive rectification, sending a first signal to each driver circuit to cause to turn off a transistor of each first transistor diode pair and a transistor of each second transistor diode pair so that a diode, and not a transistor, of each first transistor diode pair and a diode, and not a transistor, of each second transistor diode pair are commutated at a frequency of a corresponding AC electrical phase;

upon initially selecting the initial mode of rectification that is the fully synchronous rectification or changing the previously selected mode of rectification to the fully passive rectification, sending a second signal to each driver circuit to cause to turn on the transistor of each first transistor diode pair and the transistor of each second transistor diode pair so that the diode and the transistor of each first transistor diode pair and of each second transistor diode pair are commutated at the frequency of the corresponding AC electrical phase; and generating DC electrical power from the at least two sets.

13. The method of claim 12, further comprising filtering the DC electrical power generated by the rectifier.

14. The method of claim 12, further comprising:

upon initially selecting the initial mode of rectification that is a partially passive-partially synchronous rectification or changing the previously selected mode of rectification to the partially passive-partially synchronous rectification, sending the first signal to cause to turn off respectively the transistor of each first transistor diode pair or the transistor of each second transistor diode pair so that respectively the diode, and not the transistor, of each first transistor diode pair or the diode, and not the transistor, of each second transistor diode pair are commutated at the frequency of the corresponding AC electrical phase, and sending the second signal to cause to turn on respectively the transistor of each second transistor diode pair or the transistor of each first transistor diode pair so that respectively the diode and the transistor of each second transistor diode pair or the diode and the transistor of each first transistor diode pair are commutated at the frequency of the corresponding AC electrical phase;

wherein the modes of rectification comprise the fully passive rectification, the partially passive-partially synchronous rectification, and the fully synchronous rectification.

15. The method of claim 12, further comprising sending a third signal to an engine control circuit to adjust a voltage of the at least two AC electrical phases provided by the PMG to rectifier.

16. The method of claim 12, further comprising mechanically rotating the PMG with an auxiliary power unit.

17. A program product comprising a non-transitory processor readable medium on which program instructions are embodied, wherein the program instructions are configured, when executed by at least one programmable processor, to cause the at least one programmable processor to:

select an initial mode of rectification, wherein modes of rectification comprise fully passive rectification and fully synchronous rectification;

receive at least one of: (a) a level of a direct current generated by at least two sets and (b) a level of a direct current (DC) voltage generated by at least two sets, wherein each set comprises a first transistor diode pair serially electrically coupled with a second transistor diode pair, and wherein each set is configured to receive an unique alternating current (AC) electrical phase of AC electrical power;

determine whether a previously selected mode of rectification should be changed to another mode of rectification based upon at least one of: (x) whether the level of direct current is within a range of direct current levels corresponding to the other mode of rectification and (y) whether the level of the DC voltage is greater than a highest voltage threshold level of the previously selected mode of rectification, or lower than a lowest voltage threshold level of the previously selected mode of rectification;

determine that the previously selected mode of rectification should be changed to the other mode of rectification, then causing the previously selected mode of rectification to be changed to the other mode of rectification;

upon initially selecting the initial mode of rectification that is the fully passive rectification or changing the previously selected mode of rectification to the fully passive rectification, send a first signal to cause to turn off a transistor of each first transistor diode pair and a transistor of each second transistor diode pair so that a diode, and not a transistor, of each first transistor diode pair and a diode, and not a transistor, of each second transistor diode pair are commutated at a frequency of a corresponding AC electrical phase; and upon initially selecting the initial mode of rectification that is the fully synchronous rectification or changing the previously selected mode of rectification to the fully passive rectification, send a second signal to cause to turn on the transistor of each first transistor diode pair and the transistor of each second transistor diode pair so that the diode and the transistor of each first transistor diode pair and of each second transistor diode pair are commutated at the frequency of the corresponding AC electrical phase.

18. The program product of claim 17, wherein the program instructions are further configured, when executed by the at least one programmable processor, to cause the at least one programmable processor to:

upon initially selecting the initial mode of rectification that is a partially passive-partially synchronous rectification or changing the previously selected mode of rectification to the partially passive-partially synchronous rectification, send the first signal to cause to turn off respectively the transistor of each first transistor diode pair or the transistor of each second transistor diode pair so that respectively the diode, and not the transistor, of each first transistor diode pair or the diode, and not the transistor, of each second transistor diode pair are commutated at the frequency of the corresponding AC electrical phase, and send the second signal to cause to turn on respectively the transistor of each second transistor diode pair or the transistor of each first transistor diode pair so that respectively the diode and the transistor of each second transistor diode pair or the diode and the transistor of each first transistor diode pair are commutated at the frequency of the corresponding AC electrical phase;

wherein the modes of rectification comprise the fully passive rectification, partially passive-partially synchronous rectification, and the fully synchronous rectification.

19. The program product of claim 17, wherein the program instructions are further configured, when executed by the at least one programmable processor, to cause the at least one programmable processor to send a third signal to an engine control circuit to adjust a voltage of at AC electrical phases provided by a permanent magnet generator to rectifier.

20. The program product of claim 17, wherein the program instructions are further configured, when executed by the at least one programmable processor, to cause the at least one programmable processor to receive the DC voltage level from DC voltage measurement circuitry.

* * * * *

UNITED STATES PATENT AND TRADEMARK OFFICE
CERTIFICATE OF CORRECTION

| | |
|---|---|
| PATENT NO. | : 11,569,753 B1 |
| APPLICATION NO. | : 17/506338 |
| DATED | : January 31, 2023 |
| INVENTOR(S) | : Fuller et al. |

It is certified that error appears in the above-identified patent and that said Letters Patent is hereby corrected as shown below:

On the Title Page

In Item (72), under "Inventors", Line 2, delete "Darning" and insert -- Daming --, therefor.

In the Specification

In Column 11, Line 9, delete "$(\sin(\Omega^*+\varphi)$" and insert --$(\sin(\Omega^*t + \varphi)$--, therefor.

Signed and Sealed this
Twelfth Day of September, 2023

Katherine Kelly Vidal
*Director of the United States Patent and Trademark Office*